Figure 1:
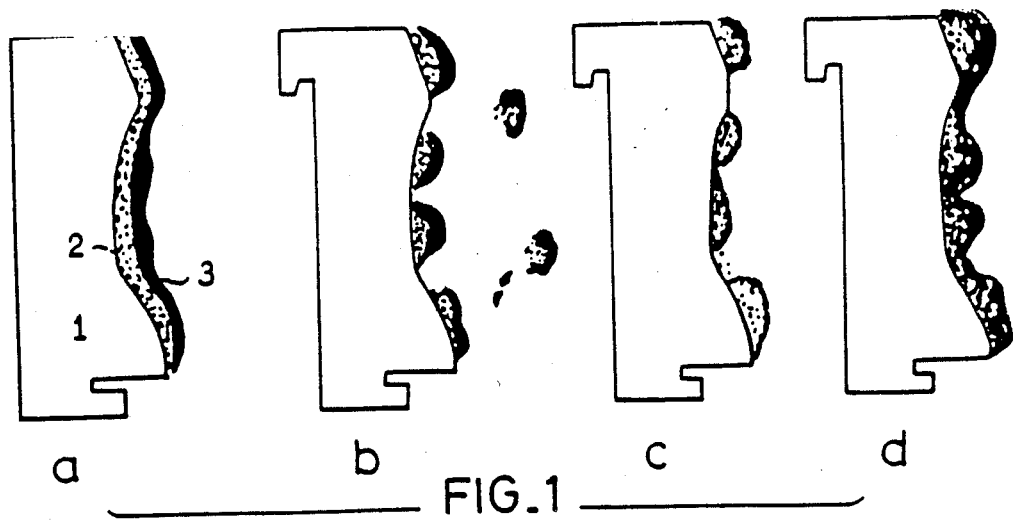

United States Patent [19]

Tangari et al.

[11] Patent Number: 4,887,791

[45] Date of Patent: Dec. 19, 1989

[54] MOULDS FOR GLASS MAKING AND USE THEREOF

[75] Inventors: Celia M. Tangari, Rio de Janeiro, Brazil; Alain Dugast, Paris; Daniel Abriou, Gagny, both of France

[73] Assignee: Saint-Gobain Emballage, Courbevoie, France

[21] Appl. No.: 246,670

[22] PCT Filed: Dec. 10, 1987

[86] PCT No.: PCT/FR87/00492

§ 371 Date: Aug. 3, 1988

§ 102(e) Date: Aug. 3, 1988

[87] PCT Pub. No.: WO88/04283

PCT Pub. Date: Jun. 16, 1988

[30] Foreign Application Priority Data

Dec. 12, 1986 [FR] France .............................. 86 17395

[51] Int. Cl.⁴ ...................... B28D 7/36; B44D 1/20
[52] U.S. Cl. ................................ 249/115; 65/357; 65/374.11; 65/122; 427/135
[58] Field of Search ............... 249/114.1, 115, 135; 427/133, 135; 65/374.11, 375, 65, 122

[56] References Cited

U.S. PATENT DOCUMENTS

| | | | |
|---|---|---|---|
| 1,662,354 | 3/1928 | Williams | 427/135 |
| 2,988,851 | 6/1961 | Holscher | 65/374.11 X |
| 3,357,481 | 12/1967 | Snyder | 249/114.1 X |
| 3,655,354 | 11/1972 | Quandt | 65/24 |
| 3,981,711 | 9/1976 | Bjorkstrom | 65/26 X |
| 4,165,974 | 8/1979 | Goodwin et al. | 65/26 |
| 4,425,411 | 1/1984 | Texor et al. | 249/111 X |

FOREIGN PATENT DOCUMENTS

| | | |
|---|---|---|
| 1264731 | 5/1961 | France . |
| 2385811 | 10/1978 | France . |
| 488121 | 7/1938 | United Kingdom . |
| WO87/05594 | 9/1987 | World Int. Prop. O. . |

OTHER PUBLICATIONS

Perry et al., Chemical Engineers' Handbook, Fifth Edition, McGraw-Hill Book Company, 1973, pp. 21–41, 23–38, 23–47 and 23–48, and 23–49.

*Primary Examiner*—Robert L. Lindsay
*Attorney, Agent, or Firm*—Oblon, Spivak, McClelland, Maier & Neustadt

[57] ABSTRACT

Cast-iron mold for the production of glass containers by using a "pressed-blown" or "blown-blown" technique wherein the parts exposed to the parison are coated with a uniform alumina layer of which the thickness is less than 5 micrometers. The invention applies to industrial techniques for producing glass containers such as bottles, flasks, jars or the like.

13 Claims, 1 Drawing Sheet

MOULDS FOR GLASS MAKING AND USE THEREOF

Techniques for industrial production of receptacles of glass of the bottle, flask, pot or similar type, are for the most part methods known as "mould-blowing" and "blow-blowing". These methods allow production at a high rate of objects of satisfactory quality for the use envisaged.

In these methods the treated glass, enters successively into contact with two moulds, that is a blank mould and a finishing mould. These moulds are the essential elements in the process which determines not only the shape but also the surface state and the mechanical qualities of the blank moulds, are subjected to very severe conditions. They are subject especially to large mechanical and thermal shocks in large number. They are also subject to the chemical action of the surrounding atmosphere and the composition of the glass. Because of these different effects the utilised surface of the mould may degrade relatively rapidly so that the mould has to be replaced. This phenomenon of degradation is very noticeable for moulds based on cast iron, which are most commonly used because of their relatively low cost, but it is also observed with moulds made of other metals and notably moulds of steel.

It is not sufficient in order to obtain satisfactory production to maintain the surface of the mould in a good condition, it is also necessary that it can form a good contact with the parison. By good contact, is meant a good introduction of the parison and then a good distribution of the latter in the blank mould. It is necessary to prevent the glass sticking to the mould, which produces an article having striations, streaks and other irregularities on its surface. According to traditional methods in order to avoid these difficulties greases are used. Systematically and at relatively short intervals of time the mould is covered with these greases which are situated between the mould and the parison.

Independently of the restrictions on production which systematic application of these greases represents, this method does not solve the problem of degradation of the mould. In order to improve the life of the mould various techniques have been proposed such as coating of the surface with layers of metal oxides such as chromium oxide, nickel oxide or titanium oxide. These proposals also have the purpose of avoiding the need for greasing as, according to the inventors, greasing would have a bad effect on the layer of metal oxide and affect its stability and life.

However it has been found that these proposals are not entirely satisfactory and that the use of a mould which is not greased does not allow the necessary degree of regularity in sliding of the parison on the mould surface. For this reason the present invention is intended to provide a method giving glassmaking moulds an increased life and, simultaneously, satisfactory properties regarding contact with the glass. The invention is also intended to give these results under conditions, notably of cost, which are advantageous over traditional methods which require frequent changing of the moulds.

For manufacture of glass objects by the mould-blowing and blow-blowing methods, the invention proposes use of metallic moulds of cast iron, notably blank moulds, of which the parts exposed to the parison are coated with a layer of aluminium oxide of thickness less than 5 micrometers.

There is found in the literature the idea of coating moulds or other members for shaping glass with layers of refractory oxides such as alumina in order to protect them against degradation resulting from thermal shock. The aim of these layers was to form a thermal barrier on the protective surface. For this reason the coating provided had a relatively large thickness of the order of 0.15 to 0.30 mm. This type of coating is not envisaged in the present invention. One reason is that the thick layers have to be obtained by relatively expensive methods such as metallisation under plasma. Also, and this is even more important for methods according to the invention, the use of thick layers requires a very specific fixing on the mould surface. Without a very strong fixing the refractory oxide becomes detached in plates. To obtain this fixing prior art suggests for example forming a deposit of a support metal previously to or simultaneously with deposition of the refractory oxide. This method is relatively complex. Also even when it is well fixed onto the substrate it is not possible to avoid in the thick layer the formation of crevasses and cracks which cause faults on the articles produced with such moulds.

In contrast to the suggestions made in the prior art, the coating of glassmaking moulds according to the invention is formed by a layer of aluminium oxide uniformly distributed and of which the thickness does not exceed a few micrometers.

The inventors have found that the effectiveness of the protective layer does not appear to increase with its thickness. Although a minimum thickness is necessary this may be as low as 0.1 micrometers. Also, a thickness greater than one micrometer does not give any especial advantage. In practice, to avoid the difficulties encountered with previous thick layers, 5 micrometers is not exceeded and there are preferably used layers of aluminium oxide of which the thickness is from 0.2 to 0.8 micrometers.

It is surprising that coatings as thin as this allow substantial modification of the behaviour of the moulds. This improvement cannot be understood as resulting from formation of a thermal barrier as this effect could only be very small taking account of the thickness of the layer. Moreover, the moulds coated in this way may be used with a grease of traditional type. Experience has in fact shown that, contrary to the prior art, use of grease does not affect the stability of the alumina layer and the latter, by mechanisms which will be indicated below in the more detailed description, improves the effectiveness of the lubricating film while facilitating its uniform distribution.

The moulds according to the invention combine an increased life with results, relative to the quality of the products prepared which are comparable to those obtained according to traditional methods. The invention also allows substantial improvements regarding the conditions of greasing. If greasing is carried out as indicated above, the stability of the lubricating layer is such that the frequency of greasing may be considerably reduced under the same operating conditions.

The advantages of the moulds according to the invention are not limited to those given above; in fact the considerable improvement in the stability of the lubricating layer allows operation under conditions of temperature which could not previously be used. Under the usual conditions the blank mould is brought to a temperature of the order of 450°–480° C. and the greasing, of which the frequency is dependent on the rate of production of the machine, is renewed every twenty minutes, for example. Under the same conditions, if all other conditions are held constant, and the temperature of the mould is increased by 50°–100° C. the greasing does not avoid sticking for more than a few minutes. Also, the degradation of the mould itself takes place very rapidly. For these reasons such as increase in working temperature is not possible in practice. The examples given below demonstrate that with moulds according to the invention temperatures of 600° C. or even more may be reached under completely acceptable conditions.

Figures 2A, 2B:
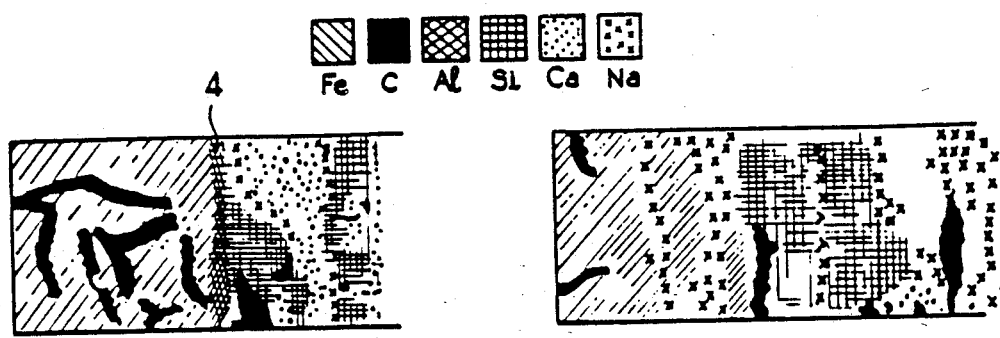

The structure of the alumina layer at the surface of the mould and the properties which result will be demonstrated with reference to the accompanying figures of the drawings. These comprise:

FIGS. 1 a–d show schematically the method of operation of a traditional greased mould, FIGS. 2a and 2b which are schematic reproductions of analyses carried out by means of an electronic microprobe on the walls of blank moulds respectively treated according to the invention and not so treated, after a certain operating time.

Figure 3:
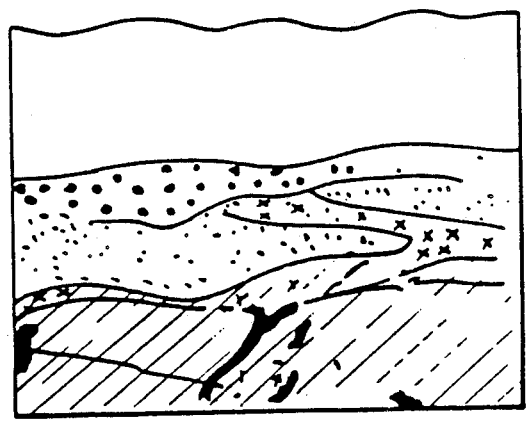

FIG. 3 which is a schematic representation of the surface of the greased mould, after use.

The mechanisms of degradation of the mould surfaces have been studied by the inventors. Their observations have led to formulation of the following hypothesis.

For a cast iron mould (1) which is not coated, the working surface is subjected to oxidation at elevated temperature and is covered rapidly with a surface layer of oxide (2). It is on this layer of oxide (2) which the film of grease (3) rests. It appears during use of the mould that the layer of iron oxide is not very resistant to the imposed thermal cycles. This layer cracks and is degraded and this effect is accelerated by the fact that the cast iron support on which it rests has a porous structure. Degradation of the oxide layer may start as indicated at 1b, with tearing away of particles* and the appearance of surface irregularities, even when, as shown at 1d, a fresh layer of grease is applied. These irregularities seem to be the reason for poor sliding of the parison in the blank mould even after new greasing and the faults which result in the products. Even though this mechanism is not yet fully understood, it is consistent with observations which have been made. It explains particularly why the degradation is a function of the treatment temperature, oxidation being of course increased at high temperature and the layer of porous oxide formed not forming an effective protection for the adjacent substrate.

The inventors have found, provided that a minimum of precautions are taken during formation of the alumina layer on the surface of the mould, that it is possible to prevent or at least considerably retard the phenomena of degradation of the mould which brings about a very substantial improvement in the life of the grease coating.

The reasons which give a strong and regular coating on the surface of the mould with a film as fine as this have not fully been understood.

Firstly, at the stage of the formation of this layer of alumina, according to the technique which will be described in greater detail below, there takes place a slight oxidation of the surface of the cast iron which is previously pickled. There is formed a layer of iron oxide on which the aluminium oxide is deposited. These two superposed layers are not of the same magnitude and do not provide an obstacle to a certain degree of migration.

Studies have shown, for example, that the aluminium migrates in the cast iron substrate probably through poorer zones formed by surface lamellae of graphite. Inversely in the proximity of external surface the content of iron is extremely low (of the order of 2%). From these results it is believed that anchoring of the layer of oxide on the cast iron by means of a scanning electron microscope an accumulation of aluminium oxide on the lamellae of graphite in the cast iron. This may explain the very good resistance to oxidation by blockage of these preferential sites for development of oxidation which the pores of containing the graphite provide. These sites also form anchoring points for the layer of oxide.

It has been found that the presence of the layer of aluminium oxide is favourable to the effectiveness of the lubricating layer in that its stability allows avoidance of frequency applications of grease associated with tearing away of surface particles of the mould, taking with them the lubricant with which they are covered. The presence of the alumina layer also has other advantages even for the parts of the mould which during use are not subject to removal of grease.

Comparative study, after use, of the surfaces which are and are not provided with the layer of alumina and greased under the same conditions demonstrate these differences in structure.

FIGS. 2a and 2b show schematically the image obtained by means of a microprobe, of the distribution of different elements at the surface of a blank mould which is treated or not treated after manufacture at 550° C. of 9500 bottles.

In these trains, the initial thickness of the layer of alumina is 0.4 micrometers. The grease used is a grease sold commercially under the name KLEENMOLD H.T. This composite grease intended for high temperatures contains silicones, graphite and soaps. It is applied as a uniform layer having a thickness of the order of 40 micrometers.

FIG. 2a shows that on the mould treated according to the invention the layer of alumina (4) remains adherent to the cast iron, partly due to the fact that the aluminium has partially diffused into the iron. The layer of alumina separates sharply the support from the constituents of the grease or of the glass. None of the elements of the latter have passed through the layer of alumina. This is particularly the case with sodium contained in the glass which is found in the layer of grease but does not reach the cast iron.

On the other hand, in FIG. 2b there is seen the diffusion of sodium into the iron which demonstrates the permeability of the lubricating layer and its lack of efficiency in protecting the substrate.

Study by the microprobe also allows detection at the surface of the iron of oxidised parts. In the mould treated according to the invention, there is practically no iron oxide in contrast to that observed on non-treated moulds. This distribution is shown in FIG. 3 which better shows interpenetration of the layer of iron oxide and the elements originating from the grease (Ca, Si) and the glass (Na).

To form a layer of alumina having a good regularity and adhering solidly to the iron substrate, various methods may be used such as for example pyrolysis under plasma, metallisation (scoopage), electrophoresis, etc.

but for reasons of simplicity it is preferred according to the invention to use liquid pyrolysis. This technique requires a minimum of material and allows obtaining of satisfactory coatings. It is especially suitable for use in an economical manner which is easy to develop in a factory under reproducible conditions.

In a particularly simple embodiment the mould which is previously pickled, is brought to the temperature of decomposition of an aluminium compound. The latter, in the form of a solution is sprayed onto the surface to be protected. The rate of feed and the time of spraying allow control of the thickness of the layer formed.

In this operation the heating and spraying may be carried out in an ordinary atmosphere. In this case it is necessary to respect certain conditions to avoid excessive oxidation of the mould before formation of the layer of alumina. The iron in fact oxidises very rapidly above about 450° C. For this reason the temperature to which the mould is brought for pyrolysis is not greater than 420° C. and the pyrolysis is immediately carried out when the chosen temperature is reached so that the layer of alumina which is formed prevents later oxidation of the substrate. The rate of increase in temperature of the mould is as fast as possible, of the order of a few minutes.

In practice it is found that a very slight oxidation of the mould does not affect the properties of the coating according to the invention. It is necessary however that thee layer of iron oxide formed remains extremely thin. It should not exceed about 0.1 micrometers otherwise the difficulties indicated above are encountered, that is a lack of adherence of the superficial layer and a rapid deterioration of the mould.

By operating as indicated a rapid heating of the mould followed by immediate deposition of the layer of alumina it is possible to limit the formation of the layer of iron oxide to the thicknesses indicated above while operating in an ordinary atmosphere.

In order to form the layer of alumina there is advantageously used a composition comprising an aluminium compound of the organometallic type in solution in a volatile solvent. By way of example there has been used as the organometallic compound aluminium acetylacetonate in solution in methanol (0.12 mole). The organometallic compound is sprayed by a means of an inner carrier gas such as nitrogen onto the surface to be coated previously brought to the decomposition temperature.

The invention also relates to methods of production using blow-blowing or mould-blowing in which, ion a general way, the operating temperatures in the blank mould are increased in comparison with the temperatures usually used, without the life of the moulds being substantially reduced.

It is not easy to define in absolute terms the operating temperatures as they are subject to a variety of factors capable of varying from one production line to another. Among these factors there may be mentioned the nature of the glass the mass of the parison, the rate of production, the nature of the mould, its mass and its method of cooling. Independently of these different variable factors, if the field is restricted to cast iron moulds treating articles of silica, soda, calcia, glass, having a mass of more than 50 grams, the temperatures of the blank mould is normally between 420° and 500° C. Under the same conditions, the treatment according to the invention is carried out at temperatures which are higher by from 50° to 100° C. approximately and situated without difficulty above 500° C. and which may exceed 600 C.

In practice, the increase in the temperature of the blank mould is adjusted by the intensity of the cooling fluid passing through the mould.

The temperatures given by way of example above are those which are measured on the internal surface of the mould in the middle part. The part of the mould corresponding to the neck is normally at a lower temperature.

The increase in temperature of the blank mould coated with alumina according to the invention is defined as that which allows, with a mass of glass which is constant in all cases, conservation or improvement of the properties of the articles produced while increasing the rate of treatment and without reducing the duration of the mould's life.

In other words the temperature in question is such that it guarantees a good formation of the blank, without sticking and without excessive wear of the mould while maintaining an acceptable frequency of greasing.

Two comparative trials have been carried out with blank moulds which are treated and not treated, used under conditions which are exactly identical, notably regarding temperature. The life of the moulds was measured in each case. The results are given below. They are expressed as hours of operation. For these trials the rate of production of flasks of 250 ml capacity weighing 130 grams is 250/mn.

| temperature °C. | 546:470 |
|---|---|
| treated | 40:69 |
| comparison | 5.5:43 |

At the usual operating temperatures it is found in the case of the invention that the life increases by 60%. This is in itself considerable but it also has to be mentioned that in the case of the invention the frequency of greasing is about 5 times less. These advantages are very important in practice but they are surpassed by those related to operations carried out with a blank mould brought to a temperature greater than the usual temperatures. This is the case for the mould working at 546° C. For each series of trials even increasing the frequency of greasing, it has not been possible to continue use of the blank mould which is not coated with alumina for more than 5.5 hours. This life is insufficient for production under these conditions to be seriously be considered. At the same temperature with a mould according to the invention, the life obtained, even though it is less than that corresponding to operation under the usual conditions, remains of an acceptable order.

Trials carried out at 580° and 610° C. leads to similar results. Even if the life of the mould tends to be reduced when the temperature increases, the latter remains always much greater than that which is observed for the same temperatures with non-coated moulds.

The increase in temperature mentioned previously allows important modifications in the production technique. Thus the inventors have found that it is possible with moulds coated with alumina layer to increase the rate of production by increasing the temperature.

The sequence of treatment operating with a blank mould at a high temperature is not fundamentally modified, but certain stages may be shortened. The dwell time in the blank mould and the transfer to the finishing mould remain practically unchanged. Because of a more rapid heating of the blank, or if desired a high overall temperature, the phase of lengthening in the finishing mould is substantially faster.

By way of example with a blank according to the invention, entering, the finishing mould at about 825° C., corresponding to a finishing mould at 550° C., the lengthening time measured on a video recorder is only about 6/10ths that obtained with a blank temperature of 787° C. (corresponding to a blank mould at 480° C.). The cooling of the finishing mould may thus be carried out more rapidly. Even if the cooling his to be slightly less intense, because of the greater quantity of heat which has to be removed by the finishing mould, the overall gain in time remains very substantial.

This gain in time is rendered possible by the fact that the finishing stage is the slowest of the process. If the rate of finishing is accelerated, the rate of forming of the blank may also be accelerated without difficulty.

By way of example for manufacture of blanks indicated above, corresponding to a mass of glass of 130 grams, the machine operates for each mould at a rate of 235 units per minute at a temperature of 480° C. With the same moulds but coated with alumina in the method provided by the invention, the temperature of the blank mould being raised to 550° C., the rate of production may be brought to slightly more than 265 units per minute, that is an increase of 13%.

Another advantage associated with the increase in temperature of the blank mould is a reduction in the difference existing between the temperature of the parison and that of the blank mould. Thus the gradient formed in the parison coming into contact with the blank mould between the surface temperature (or skin temperature) and that at the core of the parison is reduced. The reduction in this gradient facilitates a better distribution of the glass in the blank. For similar reasons the increase in the temperature of the blank also facilitates production of objects of popular shapes which are difficult to make satisfactorily. This is the case especially for bottles used for perfume comprising annular shapes.

For all the reasons indicated above, treatment of moulds according to the method of the invention is very useful in the glassmaking industry.

We claim:

1. A mold of cast iron for production of receptacles of glass by the mold-blowing or blow-blowing method, in which the parts exposed to the parison are coated with a uniform layer of alumina of which the thickness is at least 1.0 micrometer and is less than 5 micrometers, which is of sufficient regularity to resist the diffusion of sodium from the glass into the cast iron.

2. A mold according to claim 1 in which the alumina layer has a thickness from 0.1 to 0.8 micrometers.

3. A mold according to claim 1 or claim 2 in which the layer of alumina is formed by a pyrolysis of a solution of an aluminum organometallic compound capable of decomposing to form adherent alumina under pyrolysis conditions.

4. A mold according to claim 3 in which the alumina layer is formed by pyrolysis of aluminium acetylacetonate in solution in methanol.

5. A mold according to claim 3 in which formation of the layer of alumina is obtained by spraying of the solution of organometallic compound on a mold previously brought to a temperature 380° to 450° C.

6. A mold according to claim 5 in which for formation of the alumina layer, the surface of the mold to be coated in pickled to remove iron oxide and any grease residues which may be present before the pyrolysis.

7. A mold according to claim 6 in which the heating preceding pyrolysis is carried out under such conditions that possible oxidation of the mould gives a layer of iron oxide not exceeding 0.1 micrometers in thickness.

8. A method of producing glass receptacles by the mold-blowing or blow-blowing method in which there is used at least one blank mould according to one of claims 1 or 2.

9. A method according to claim 8 in which the blank molds, coated with a layer of alumina, are greased.

10. A method according to claim 8 in which the temperature of the blank mold is held at a value of at least 500° C.

11. A mold according to claim 1 or claim 2 in which any layer of iron oxide upon the exposed parts prior to coating with alumina does not exceed 0.1 micrometers in thickness.

12. A method of producing glass receptacles by the mold-blowing or blow-blowing method in which there is used at least one blank according to claim 11.

13. A method according to claim 12 in which the temperature of the blank mold is held to a value of at least 500° C.

* * * * *